US010325355B2

(12) United States Patent
Ono

(10) Patent No.: US 10,325,355 B2
(45) Date of Patent: Jun. 18, 2019

(54) VIDEO SIGNAL PROCESSING APPARATUS, VIDEO SIGNAL PROCESSING METHOD, AND PROGRAM

(71) Applicant: CANON KABUSHIKI KAISHA, Tokyo (JP)

(72) Inventor: Tadayoshi Ono, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 134 days.

(21) Appl. No.: 15/341,562

(22) Filed: Nov. 2, 2016

(65) Prior Publication Data

US 2017/0132766 A1 May 11, 2017

(30) Foreign Application Priority Data

Nov. 5, 2015 (JP) ................................ 2015-217741

(51) Int. Cl.
*G06T 5/00* (2006.01)
*H04N 5/232* (2006.01)

(52) U.S. Cl.
CPC .............. *G06T 5/003* (2013.01); *G06T 5/009* (2013.01); *H04N 5/232* (2013.01); *G06T 2207/10016* (2013.01); *G06T 2207/20192* (2013.01)

(58) Field of Classification Search
None
See application file for complete search history.

(56) References Cited

U.S. PATENT DOCUMENTS

2006/0055654 A1* 3/2006 Sagawa ................ G09G 3/3648 345/98
2007/0132860 A1* 6/2007 Prabhu ................... H04N 5/232 348/231.3
2010/0073510 A1* 3/2010 Nemoto ............ H04N 5/23245 348/223.1
2013/0223738 A1* 8/2013 Obara ....................... G06T 5/20 382/170
2016/0371821 A1* 12/2016 Hayashi ............... H04N 5/3572

FOREIGN PATENT DOCUMENTS

JP 2003-230052 A 8/2003
JP 2008-103979 A 5/2008

* cited by examiner

*Primary Examiner* — Kim Y Vu
*Assistant Examiner* — Nathan J Bloom
(74) *Attorney, Agent, or Firm* — Canon U.S.A., Inc. IP Division

(57) ABSTRACT

An image processing unit performs gamma correction on a video signal using a gamma characteristic selected from among a plurality of gamma characteristics. Further, in a case where a gamma characteristic used in the gamma correction is changed by selection of the gamma characteristic, the image processing unit calculates a contour correction characteristic corresponding to the changed gamma characteristic and performs contour correction using the contour correction characteristic on the video signal.

6 Claims, 9 Drawing Sheets

VIDEO SIGNAL PROCESSING APPARATUS, VIDEO SIGNAL PROCESSING METHOD, AND PROGRAM

BACKGROUND OF THE INVENTION

Field of the Invention

One disclosed aspect of the embodiments relates to a video signal processing apparatus and a video signal processing method.

Description of the Related Art

Recent digital video cameras are provided with various photographing modes for meeting users' needs. In these photographing modes, there is a mode which is characterized by, for example, photographic gamma (camera gamma). Since various gamma characteristics are provided as the photographic gamma, a gamma characteristic is selected according to the photographing mode, and gamma correction processing is performed based on the selected gamma characteristic, so that various image qualities different in gradation characteristics can be realized.

In addition, conventionally, contour correction is often performed together with the gamma characteristic. For example, in Japanese Patent Application Laid-Open No. 2008-103979, an image processing apparatus is described which performs the gamma correction on an image signal to generate a luminance signal and performs the contour correction on the gamma corrected luminance signal using a contour correction gain corresponding to a luminance amount of the image signal. Further, for example, in Japanese Patent Application Laid-Open No. 2003-230052, an electronic camera is described which determines a contour enhancement coefficient used in contour enhancement processing based on photographing information when an image is captured and performs the contour enhancement processing on the gamma corrected luminance signal using the contour enhancement coefficient.

As the gamma correction processing, processing is known which includes knee processing for compressing contrasts in middle to high luminance areas. When the gamma correction processing including the knee processing is performed, in the contour correction processing, the contour correction is strongly performed on the middle to high luminance areas in which the gradations are compressed by the knee processing. Further, the contour correction is weakly performed on low to middle luminance areas which include sufficient gradations. However, for example, when the gamma correction processing is changed from the above-described processing including the knee processing to the gamma correction processing by a different gamma characteristic due to a change of the photographing mode, the image quality may be lowered by the contour correction.

SUMMARY OF THE INVENTION

According to an aspect of the embodiments, a video signal processing apparatus includes a gamma correction unit configured to perform gamma correction on a video signal using a gamma characteristic selected from among a plurality of gamma characteristics, and a contour processing unit configured to, in a case where a gamma characteristic used in the gamma correction is changed by selection of the gamma characteristic, calculate a contour correction characteristic corresponding to the changed gamma characteristic and perform contour correction using the contour correction characteristic on the video signal.

Further features of the disclosure will become apparent from the following description of exemplary embodiments with reference to the attached drawings.

DESCRIPTION OF THE EMBODIMENTS

Various exemplary embodiments according to the disclosure will be described in detail below with reference to the attached drawings.

<Configuration of Digital Video Camera>

Figure 1:
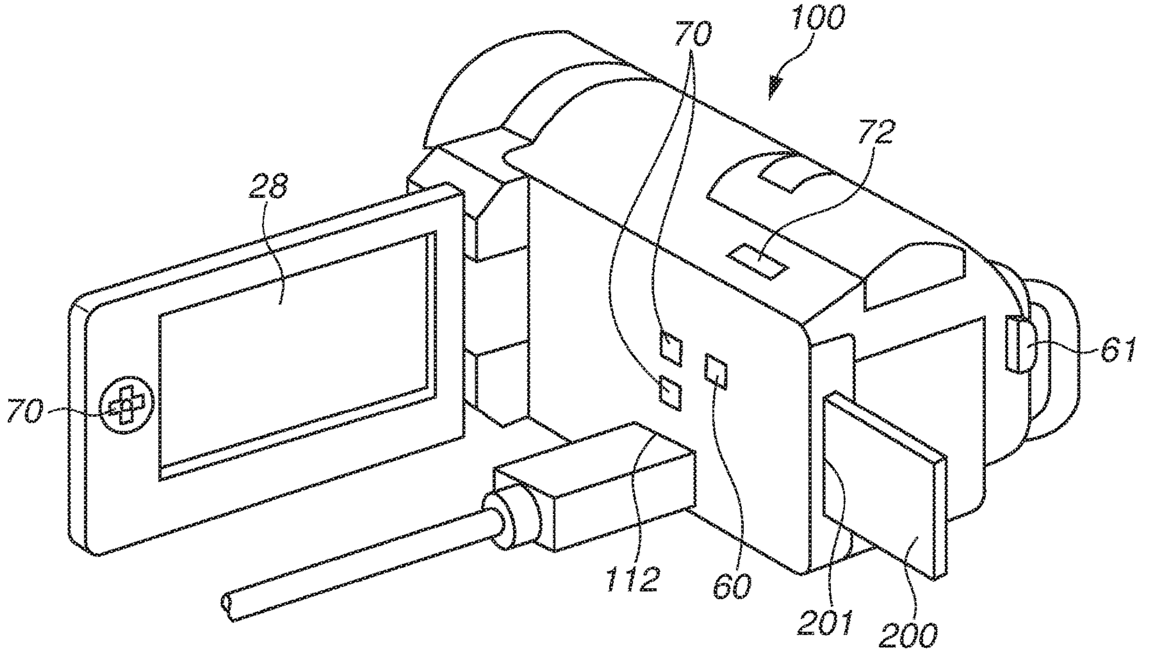
FIG. 1 is an external appearance of a video camera according to an exemplary embodiment.

FIG. 1 is a schematic perspective view of a video camera 100 as an exemplary embodiment of a video signal processing apparatus. In FIG. 1, a display unit 28 is a monitor for displaying videos and various information pieces. A recording switch 61 is an operation unit for a user to perform a photographing instruction. A mode changeover switch 60 is an operation unit for switching various modes of the video camera 100. A user can instruct the video camera 100 to switch the photographing modes such as a normal photographing mode and a high luminance priority mode which are described below by operating the mode changeover switch 60. A connector 112 is an interface unit to which various cables for data communication and the like are connected. An operation unit 70 includes manipulators such as various buttons and a cross key for receiving a setting operation and other various operations from a user. A power switch 72 is a switch for switching power-on and power-off by a user operation. A storage medium 200 is a storage medium such as a memory card and a hard disk. A storage medium slot 201 is a mountable/detachable slot for storing the storage medium 200. The storage medium 200 stored in the storage medium slot 201 can communicate with the video camera 100.

<Internal Configuration of Digital Video Camera>

Figure 2:
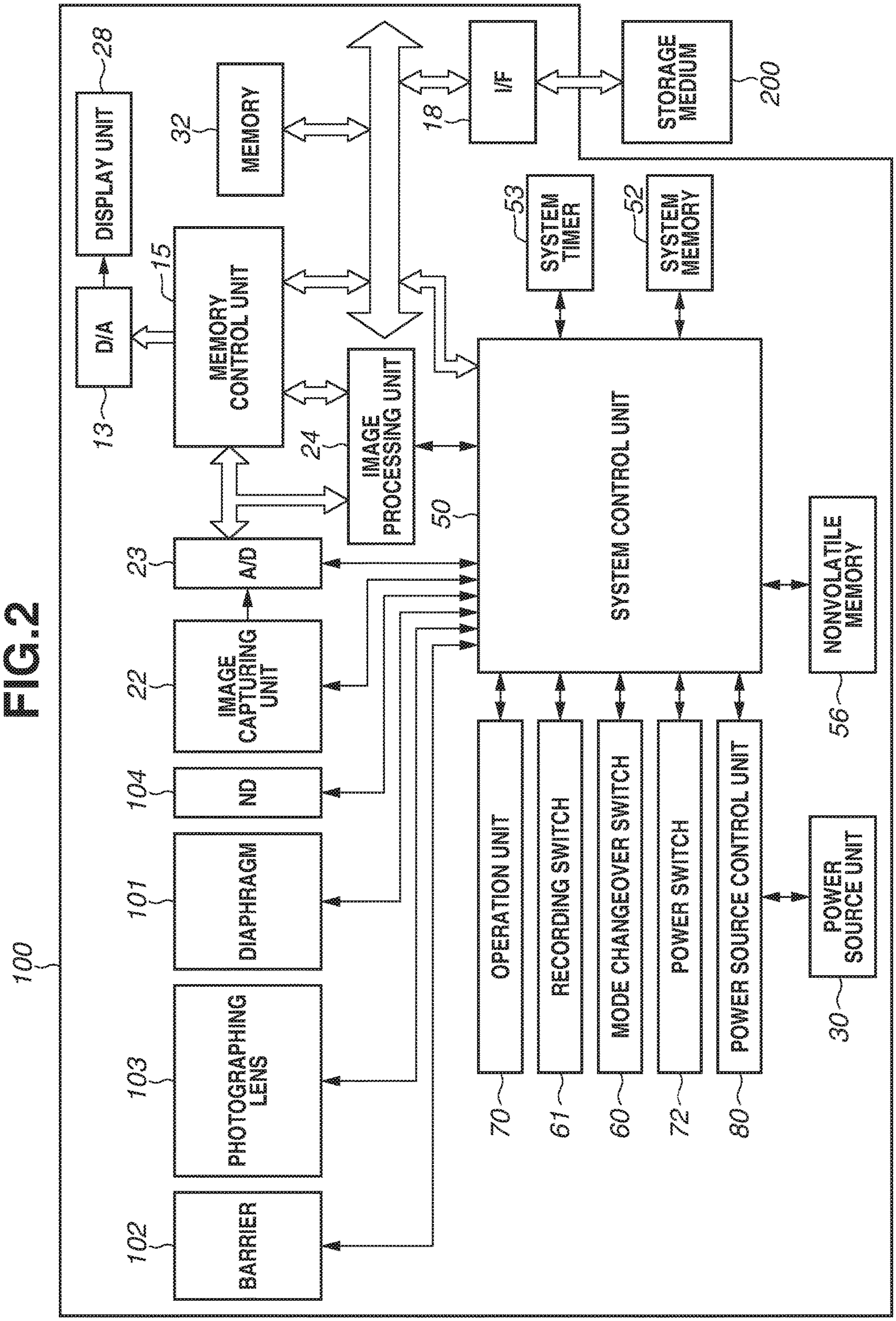
FIG. 2 illustrates a schematic internal configuration of the video camera according to the exemplary embodiment.

FIG. 2 is a block diagram illustrating a schematic internal configuration of the video camera 100 according to the present exemplary embodiment. In FIG. 2, a photographing lens 103 is a lens group including a zoom lens and a focus lens and forms an object image and the like on an imaging plane of an image capturing unit 22. A diaphragm 101 is a configuration for adjusting a light amount. A neutral density (ND) filter 104 is used for dimming. The image capturing unit 22 is an image sensor constituted of a charge coupled device (CCD), a complementary metal oxide semiconductor (CMOS), and the like which convert an optical image formed on the imaging plane by the photographing lens 103 into an electrical signal. The image capturing unit 22 also have functions of controlling charge accumulation by an electronic shutter, adjusting an analog gain, changing a reading speed, and the like. An analog-to-digital (A/D) converter 23 outputs a digital video signal formed from a code value obtained by performing digital conversion on an analog image capturing signal output from the image capturing unit 22. A barrier 102 covers an image capturing system including the photographing lens 103 of the video camera 100 to protect the image capturing system including the photographing lens 103, the diaphragm 101, and the image capturing unit 22 from dirt and breakage.

An image processing unit 24 performs various signal processing such as pixel interpolation, resizing processing such as image reduction, color conversion processing, gamma correction, contour correction, and addition of a digital gain on a video signal from the A/D converter 23 or a video signal read out from a memory control unit 15. Further, the image processing unit 24 performs predetermined calculation processing using a captured video signal and transmits calculation result information to a system control unit 50. The system control unit 50 performs exposure control, ranging control, white balance (WB) control, and the like based on the calculation result information transmitted from the image processing unit 24. Accordingly, automatic focus (AF) processing, automatic exposure (AE) processing, automatic white balance (AWB) processing, and the like by a through the lens (TTL) method are performed. Although details are described below, according to the present exemplary embodiment, processing related to the gamma correction and the contour correction is especially described in each processing performed by the image processing unit 24. These functions may be implemented as instructions to be executed by a local processor (not shown) or by the system control unit 50.

The video signal output from the A/D converter 23 is directly written into a memory 32 via the image processing unit 24 and the memory control unit 15 or via the memory control unit 15. The memory 32 stores the video signal captured by the image capturing unit 22 and digitally converted by the A/D converter 23 and a video signal to be displayed on the display unit 28. The memory 32 have a storage capacity sufficient for storing long hours of moving image signals and audio signals. The memory 32 also functions as a memory (video memory) for displaying images. A digital-to-analog (D/A) converter 13 converts a digital video signal for display read out from the memory 32 into an analog signal and supplies the analog signal to the display unit 28. Accordingly, a video of the video signal for display read out from the memory 32 is displayed on a screen of the display unit 28. The display unit 28 displays a video corresponding to an analog video signal from the D/A converter 13 on a display screen such as a liquid crystal display (LCD). In addition, when digital signals subjected to the A/D conversion by the A/D converter 23 and temporarily stored in the memory 32 are subjected to analog conversion by the D/A converter 13 and successively transferred to the display unit 28, the display unit 28 functions as an electronic view finder. In other words, a live view video (through video) is displayed on the display unit 28 in this case.

A nonvolatile memory 56 is an electrically erasable recordable memory, and for example, an electrically erasable and programmable read only memory (EEPROM) may be used. The nonvolatile memory 56 stores constants, programs, and the like for operating the system control unit 50. A program described here is a program for the system control unit 50 and others to execute processing in each flowchart described below.

The system control unit 50 controls the video camera 100, including executing functions in the image processing unit 24. The system control unit 50 may be a specialized processor (such as an embedded controller or a digital signal processor) or a general purpose processor that may execute instructions in a program stored in the nonvolatile memory 56 to perform functions or operations described in the flowcharts shown in FIGS. 6 and 9. Each processing described below according to the present exemplary embodiment is realized by the system control unit 50 executing the program stored in the nonvolatile memory 56. A system memory 52 includes a random access memory (RAM) and the like. In the system memory 52, constants and variables for operating the system control unit 50, programs read out from the nonvolatile memory 56, and the like are developed. The system control unit 50 also performs display control by controlling the memory 32, the D/A converter 13, the display unit 28, and the like.

The mode changeover switch 60, the recording switch 61, and the operation unit 70 are used by a user to input various operation instructions to the system control unit 50. The mode changeover switch 60 is used when a user switches an operation mode of the video camera 100 to any of a playback mode, a moving image photographing mode, a still image photographing mode, and the like. The moving image photographing mode and the still image photographing mode further includes an automatic photographing mode, an automatic scene determination mode, a manual mode, various scene mode for a photographing setting for each photographing scene, a program AE mode, a custom mode, and the like. The moving image photographing mode and the still image photographing mode further include photographing modes such as the normal photographing mode and the high luminance priority mode which are described below. The mode changeover switch 60 is also used when a user inputs a switching instruction to each of these modes included in the moving image photographing mode and the still image photographing mode. Which mode is used from these modes included in the moving image photographing mode may be directly changed via an operation of the mode changeover switch 60. Alternatively, the mode may be once switched to the moving image photographing mode or the still image photographing mode by the mode changeover switch 60 and then switched to any of the modes included in the relevant photographing mode using another manipulator or the like. The system control unit 50 controls various signal processing and operations of the video camera 100 based on an operation instruction from a user via the mode changeover switch 60.

The recording switch 61 is a switch used when a user inputs an instruction to switch a photographing standby state and a photographing state. When a user inputs an instruction to start photographing via the recording switch 61, the system control unit 50 controls the video camera 100 to be the photographing state and start a series of operations from reading out of a signal from the image capturing unit 22 to writing of a video signal to the storage medium 200. The operation unit 70 includes each manipulator such as the cross key of vertical and horizontal four directions and a SET button. When various functions icons displayed on the display unit 28 is selected and operated, each manipulator of the operation unit 70 is appropriately assigned a function for each photographing scene (scene) and can be used as various function buttons. As the function buttons, there are, for example, an end button, a return button, an image advancing button, a jump button, a narrowing down button, an attribute changing button, a menu button, and others. For example, when the SET button which is set as the menu button in the initial setting is pressed, a menu screen via which various settings can be performed is displayed on the display unit 28. A user can intuitively perform various settings using the menu screen displayed on the display unit 28, the cross key of vertical and horizontal four directions, and the SET button.

A system timer 53 is a timing unit for measuring a time used for various types of control and a time of a built-in clock. A power source control unit 80 is constituted of a battery detection circuit, a direct current (DC)-DC converter, a switching circuit for switching each circuit block to be energized, and the like and detects whether a battery is mounted or not, a type of the battery, a remaining battery capacity, and the like. Further, the power source control unit 80 controls the DC-DC converter based on the detection result and an instruction from the system control unit 50 and supplies a necessary voltage for a necessary time period to each of the units including the storage medium 200. A power source unit 30 includes a primary battery such as an alkaline battery and a lithium battery, a secondary battery such as a nickel-cadmium (NiCd) battery, a nickel-metal hydride (NiMH) battery, and a lithium (Li)-ion battery, an alternate current (AC) adapter, and the like. A storage medium interface (I/F) 18 is an interface to the storage medium 200 such as a memory card and a hard disk. The storage medium 200 is a storage medium for storing the captured video signal and includes a memory card such as a semiconductor memory and a magnetic disk such as a hard disk.

<Descriptions of High Luminance Priority Mode and Normal Photographing Mode>

The video camera 100 according to the present exemplary embodiment is provided with various modes for performing exposure control and image quality control suitable for a purpose of photographing a characteristic object as the photographing modes for meeting users' needs. The image quality control mode includes a mode in which a luminance area of an object image to be assigned with many gradations is characterized by photographic gamma (camera gamma) according to a characteristic of the object image. The photographic gamma includes various gamma characteristics, and correction processing is performed by these various gamma characteristics, so that various image qualities different in gradation characteristics can be realized. The gamma correction processing by the photographic gamma is the correction processing for converting input values (code values) of red (R), green (G), and blue (B) into output values (code values) corresponding to a gamma curve. The gamma correction by the photographic gamma is the processing for performing the gradation correction especially on brightness (luminance components) of the video signal by converting the input values of R, G, and B into the output values corresponding to the gamma curve. In the following description, brightness (luminance components) of a video signal to be subjected to the gamma correction by the photographic gamma is referred to as "luminance of a video signal" or just as "luminance".

The video camera 100 according to the present exemplary embodiment includes at least the high luminance priority mode and the normal photographing mode as the photographing modes for capturing a video and can switch the normal photographing mode and the high luminance priority mode according to the photographing mode selected by a user. When the photographing mode is the normal photographing mode, the gamma characteristic used by the image processing unit 24 in the gamma correction processing is a gamma curve for the normal photographing mode. On the other hand, when the photographing mode is the high luminance priority mode, the gamma characteristic used by the image processing unit 24 in the gamma correction processing is a gamma curve for the high luminance priority mode. The normal photographing mode, the high luminance priority mode, and the gamma characteristics (the gamma curves) used in the gamma correction processing of the respective modes are described in detail below.

Figure 3:
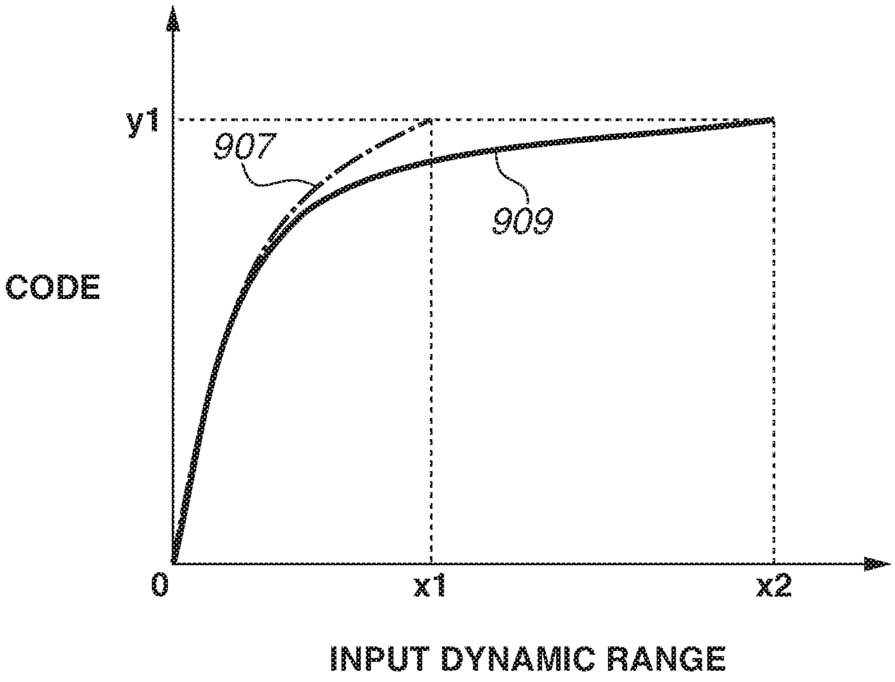
FIG. 3 illustrates gamma characteristics of a normal photographing mode.

The normal photographing mode is a mode in which the gamma correction processing including the knee processing for compressing a contrast in the middle to high luminance areas is performed while maintaining a practical input dynamic range. The gamma correction characteristic in the case of the normal photographing mode is described with reference to FIG. 3. FIG. 3 illustrates gamma characteristics (gamma curves) of the gamma correction processing performed when a video is captured. A gamma characteristic 907 in FIG. 3 is a gamma characteristic corresponding to a range indicated by 0 to *1 in the input dynamic range which is the gamma characteristic standardized by International Telecommunication Union Radiocommunications Sector (ITU-R), Broadcasting service (television) BT.709 and the like. On the other hand, a gamma characteristic 909 in FIG. 3 is a gamma characteristic corresponding to a range indicated by 0 to *2 in the input dynamic range when the input dynamic range is expanded to a practical range. When it is compared to the gamma characteristic 907, the gamma characteristic 909 is a characteristic for compressing a contrast in the middle to high luminance areas. The gamma characteristic 909 is a characteristic which secures an output (brightness) in a dark part of the low luminance area to the middle luminance area in which visual sensitivity of human is high while expanding the input dynamic range. On the other hand, in the high luminance area in which the visual sensitivity of human is low, a data amount is reduced by reducing bit numbers allocated to an output code.

In the case of the normal photographing mode, the image processing unit 24 of the video camera 100 performs the gamma correction processing for converting an input code of a video signal into an output code corresponding to the gamma curve of the gamma characteristic 909. The video signal after subjected to the gamma correction processing and the like in the normal photographing mode is, for example, recorded and then reproduced to be displayed on the display unit 28 in FIG. 2. Although it is not illustrated, the gamma correction processing is performed when a video is displayed on the display unit 28, and in the gamma correction processing at that time, for example, an inverse gamma characteristic of the gamma characteristic 909 is used.

Figure 4A:
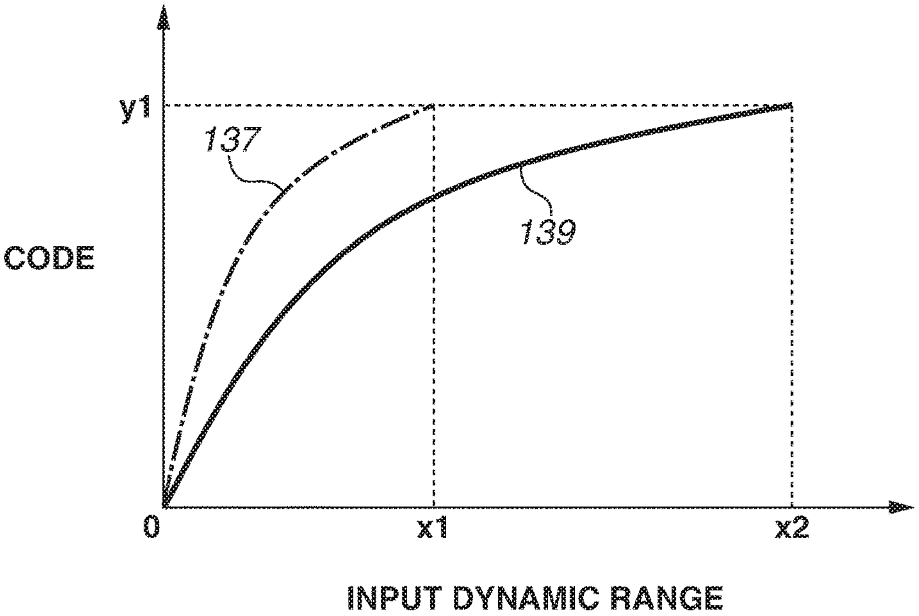
FIGS. 4A to 4D illustrate gamma characteristics of a high luminance priority mode.
Figures 4B, 4C, 4D:
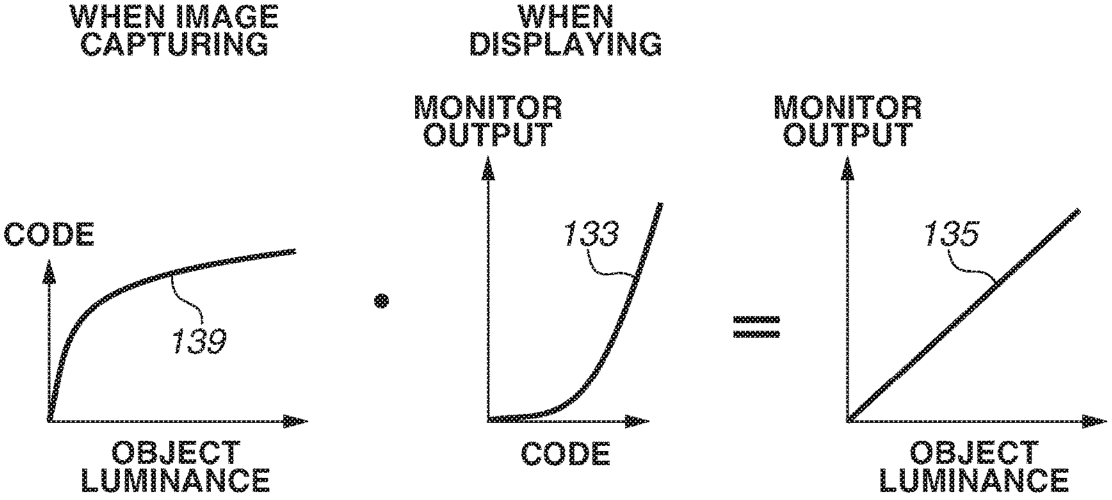

Next, the gamma correction characteristic in the case of the high luminance priority mode is described with reference to FIGS. 4A to 4D. FIGS. 4A and 4B illustrate the gamma characteristics of the gamma correction processing performed when a video is captured. FIG. 4C illustrates the gamma characteristic of the gamma correction processing performed when a video is displayed. FIG. 4D illustrates the gamma characteristic of a total video signal processing system including image capturing and displaying.

A gamma characteristic 137 in FIG. 4A is a gamma characteristic corresponding to a range indicated by 0 to *1 in the input dynamic range which is the gamma characteristic standardized by ITU-R BT.709 and the like similar to the gamma characteristic 907 in FIG. 3. On the other hand, a gamma characteristic 139 in FIG. 4B is a gamma characteristic corresponding to a range indicated by 0 to *2 in the input dynamic range when the input dynamic range is expanded to the practical range. The gamma characteristic 139 has a characteristic which maintains a relationship of the output code to the input code constant and fixes a bit allocation ratio with respect to codes from the low luminance to the high luminance without changing when the gamma characteristic 137 is used as a reference.

In the case of the high luminance priority mode, the image processing unit 24 performs the gamma correction processing for converting the input code of the luminance of the video signal into the output code corresponding to the gamma curve of the gamma characteristic 139. The video signal after subjected to the gradation correction processing in the high luminance priority mode is, for example, recorded and then reproduced to be displayed on the display unit 28 according to the present exemplary embodiment.

As described above, in the high luminance priority mode, the gamma correction processing is performed on the entire luminance areas from the low to high luminance areas using the gamma characteristic 139 which matches a relationship of the output code to the input code with a relationship between the input code and the output code of the reference gamma characteristic 137. Further, in the high luminance priority mode, the bit allocation ratio with respect to the output code is fixed without changing in the entire luminance areas from the low to high luminance areas. In the high luminance priority mode, the gamma correction processing is performed by the gamma characteristic 139 in which the relationship of the output code to the input code is maintained constant on the basis of the gamma characteristic 137, so that compression of the contrast in the high luminance area is not performed as in the normal photographing mode.

On the other hand, in the gamma correction processing performed when a video is displayed on the display unit 28, a gamma characteristic 133 which is an inverse characteristic of the gamma characteristic 139 is used as illustrated in FIG. 4C. In this case, the gradation characteristic of the total video signal processing system from image capturing to displaying is the gradation characteristic 135 as illustrated in FIG. 4D. In other words, the gradation characteristic 135 in the total video signal processing system is a linear characteristic in the entire luminance areas from the low to high luminance areas. Therefore, in the case of the high luminance priority mode, the linear gradation characteristic like the gradation characteristic 135 in FIG. 4D is realized in the video signal processing system, and the displayed video is a natural one in which gradations, colors, and a sense of sharpness of an actual object are naturally reproduced.

Further, the gamma characteristic 139 in the high luminance priority mode is a characteristic which makes the low to middle luminance areas relatively dark as compared to the gamma characteristic 909 in the normal photographing mode. Thus, the system control unit 50 of the video camera 100 according to the present exemplary embodiment performs setting control of a peak luminance value so as to increase a peak luminance value of display on the display unit 28 when a video is displayed. Although it is not illustrated, a configuration for setting the peak luminance value is installed, for example, in the image processing unit 24. As described above, when the gamma correction processing is performed in the high luminance priority mode, the peak luminance value is increased when a video is displayed, so that the video can be prevented from being dark. Further, in this case, a state can be maintained in which contrasts are not compressed throughout the entire area from a dark part to a highlight part, so that gradations, color reproducibility, and a sense of sharpness can be remarkably improved in, for example, shine of metal, transparency of water, three-dimensional appearance of the blue sky and clouds, skin tones, and the like. Furthermore, in the normal photographing mode, for example, light of a point light source and the like in a night scene seems larger than it really is due to the compression of the contrast in the high luminance area by the knee processing, however, there is no unnecessary spread of light in the high luminance priority mode. Thus, in the high luminance priority mode, the light of the point light source and the like can be expressed in more natural gradations.

<Descriptions of Photographing Mode and Contour Correction>

In the video camera 100 according to the present exemplary embodiment, the image processing unit 24 also performs the contour correction processing as described above. In this regard, the contour correction processing must be processing suitable for the gamma characteristic used in the gamma correction processing. Thus, the video camera 100 according to the present exemplary embodiment can realize the contour correction processing by a contour correction characteristic suitable for the gamma characteristic used in the gamma correction processing. As an example, when the gamma characteristic 909 in the normal photographing mode is used in the gamma correction processing, the image processing unit 24 of the video camera 100 performs the stronger contour correction on the middle to high luminance areas and performs the weaker contour correction on the low to middle luminance areas. As described above, the contour correction processing is performed by the contour correction characteristic suitable for the gamma characteristic, and accordingly a sense of apparent resolution can be maintained in the middle to high luminance areas, and a difference in an apparent gradation of each luminance by the gamma characteristic can be unnoticeable in the low to middle luminance areas.

On the other hand, for example, the gamma characteristic 139 in the high luminance priority mode has a larger slope of the gamma curve in the middle to high luminance areas and a smaller slope of the gamma curve in the low to middle luminance areas than those of the gamma characteristic 909 in the normal photographing mode. Thus, in the case of the high luminance priority mode, the apparent gradation is increased in the middle to high luminance areas, and the gradation is decreased in the low to middle luminance areas as compared to the normal photographing mode. In the case that the gamma correction processing is performed in the high luminance priority mode, for example, if the stronger contour correction is performed on the middle to high luminance areas and the weaker contour correction is performed on the low to middle luminance areas as with the normal photographing mode, the image quality may be lowered. For example, when the stronger contour correction is performed on the middle to high luminance areas, jaggies and moire are generated, and a sense of apparent noise on an edge (contour) is deteriorated. Further, when the weaker contour correction is performed on the low to middle luminance areas, the sense of apparent resolution is lowered, and the visibility is also lowered. As described above, when the contour correction suitable for the gamma characteristic in the normal photographing mode is performed as it is on a signal subjected to the gamma correction processing in the high luminance priority mode, deterioration of the image quality may be caused by excessive or deficient correction in the contour correction.

Thus, when the gamma characteristic is changed by the change of the photographing mode, the video camera 100 according to the present exemplary embodiment generates the contour correction characteristic suitable for the changed gamma characteristic based on the contour correction characteristic set according to the gamma characteristic before the change and performs the contour correction. Accordingly, the video camera 100 according to the present exemplary embodiment avoids a state in which excessive or deficient correction is caused in the contour correction due to the change of the gamma characteristic.

Processing for generating the contour correction characteristic when the gamma characteristic is changed by the change of the photographing mode is described below. An example is described here in which the gamma characteristic 909 is changed to the gamma characteristic 139 because the mode is changed to the high luminance priority mode from a state in which the contour correction characteristic suitable for the gamma characteristic 909 in the normal photographing mode is already set. The gamma characteristic 909 and the gamma characteristic 139 are gamma characteristics when the input dynamic ranges are respectively expanded to practical ranges of 0 to *2 on the basis of the standardized gamma characteristic 137 (907) as described above in FIG. 3 and FIG. 4A.

<Configuration and Processing Flow in First Exemplary Embodiment>

Figure 5:
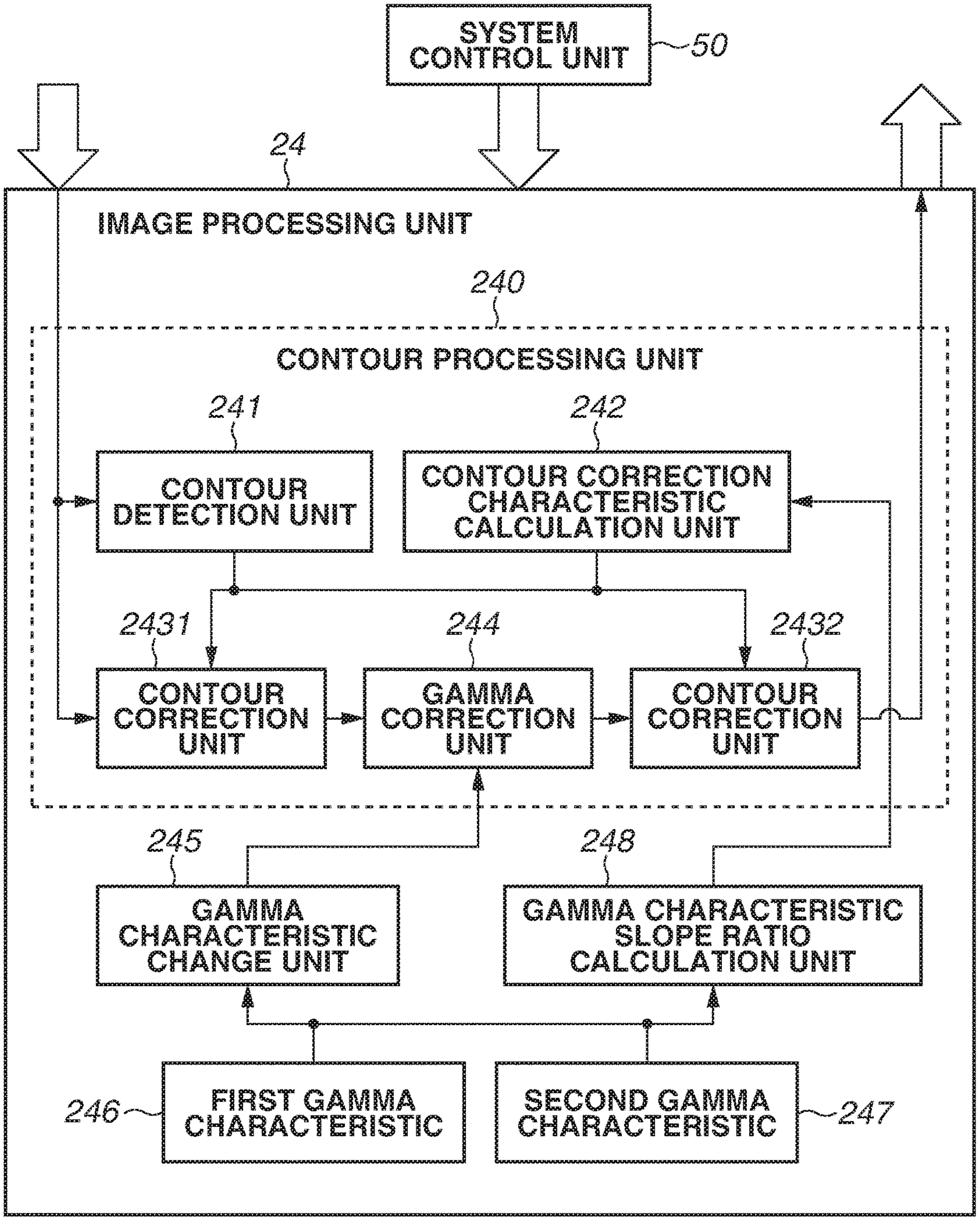
FIG. 5 is a functional block diagram illustrating a main part of an image processing unit according to a first exemplary embodiment.

According to the present exemplary embodiment, the change of the gamma characteristic in response to the change of the photographing mode and generation of the contour correction characteristic and the contour correction processing based on the change of the gamma characteristic are processing performed by the image processing unit 24 of the video camera 100. FIG. 5 illustrates each main processing performed by the image processing unit 24 according to the first exemplary embodiment as a functional block. FIG. 5 illustrates an example which corresponds to two modes, i.e., the normal photographing mode and the high luminance priority mode as the photographing modes, and a first gamma characteristic 246 for the normal photographing mode and a second gamma characteristic 247 for the high luminance priority mode are provided. The first gamma characteristic 246 corresponds to the gamma characteristic 909 described above in FIG. 3, and the second gamma characteristic 247 corresponds to the gamma characteristic 139 described above in FIG. 4A. Information of the gamma curves of the first gamma characteristic 246 and the second gamma characteristic 247 may be preliminarily provided, for example, in the nonvolatile memory 56 described above in FIG. 2 or may be generated by the image processing unit 24 or the system control unit 50 in response to the photographing mode. In this regard, two modes, i.e., the normal photographing mode and the high luminance priority mode are described here as examples of the photographing modes, and thus there are two gamma characteristics, i.e., the first gamma characteristic 246 and the second gamma characteristic 247, however, the gamma characteristic according to the present exemplary embodiment is not limited to two. For example, when there is a plurality of photographing modes other than the normal photographing mode and the high luminance priority mode, and the gamma characteristics are respectively different in each of the photographing modes, information of a gamma curve of a plurality of the gamma characteristics is also provided or generated corresponding to each of the plurality of photographing modes. Further, when any one of the gamma characteristics is used by the change of the photographing mode, the contour correction characteristic suitable for the gamma characteristic to be used is generated. A configuration when the photographing mode is changed to other than the normal photographing mode and the high luminance priority mode is omitted from illustration and description.

In FIG. 5, a gamma correction unit according to the present exemplary embodiment includes the first gamma characteristic 246, the second gamma characteristic 247, a gamma characteristic change unit 245, and a gamma correction unit 244. Further, in FIG. 5, a contour processing unit 240 according to the present exemplary embodiment includes a contour detection unit 241, the contour correction characteristic calculation unit 242, contour correction units 2431 and 2432, and the gamma characteristic slope ratio calculation unit 248.

Figure 6:
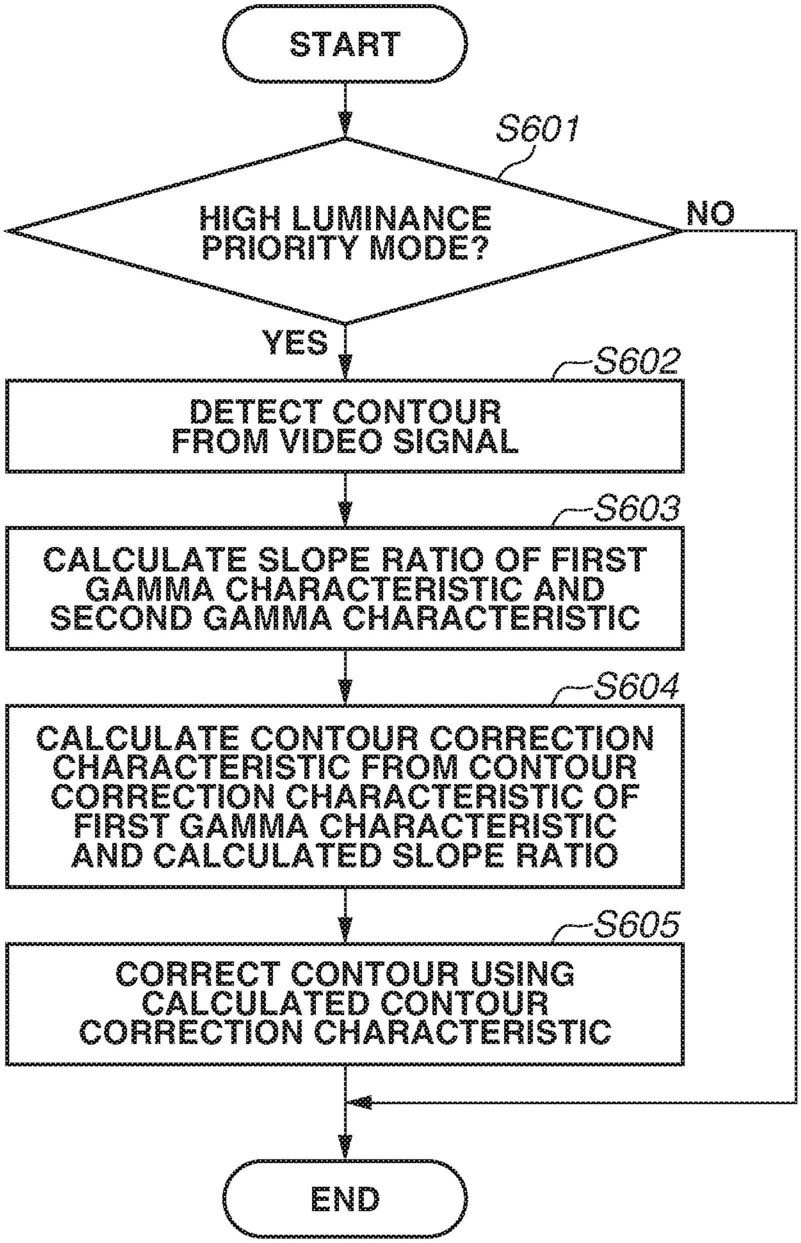
FIG. 6 is a flowchart illustrating processing according to the first exemplary embodiment.

Processing by the image processing unit 24 according to the first exemplary embodiment illustrated in FIG. 5 is described below with reference to a flowchart in FIG. 6. FIG. 6 is a flowchart illustrating a flow from change setting processing of the gamma characteristic in response to the change of the photographing mode to generation of the contour correction characteristic and the contour correction processing performed by the image processing unit 24 according to the first exemplary embodiment. In the following description, steps S601 to S605 of each processing in FIG. 6 is abbreviated as S601 to S605. The image processing unit 24 executes a video signal processing program according to the first exemplary embodiment and realizes the processing in the flowchart illustrated in FIG. 6. Although it is not illustrated, the image processing unit 24 may perform the processing in the flowchart in FIG. 6 using the gamma correction unit, the contour correction unit, and the like provided as a hardware configuration. In the case of the example in which the image processing unit 24 includes the gamma correction unit, the contour correction unit, and the like as the hardware configuration, the system control unit 50 executes the control program and controls the hardware configuration of the image processing unit 24 to realize the processing in the flowchart in FIG. 6.

When the photographing mode is changed, the system control unit 50 of the video camera 100 according to the present exemplary embodiment transmits to the image processing unit 24 a gamma characteristic change request (hereinbelow, abbreviated as "the change request") for requesting a change to a gamma characteristic corresponding to the changed photographing mode. The image processing unit 24 starts the processing in the flowchart in FIG. 6 when receiving the change request from the system control unit 50. In the following description, the photographing mode is set to the normal photographing mode before the image processing unit 24 receives the change request. Thus, the gamma characteristic is set to the first gamma characteristic 246 in the normal photographing mode before the image processing unit 24 receives the change request, and the contour correction characteristic is set to a characteristic suitable for the first gamma characteristic 246. The flowchart in FIG. 6 illustrates the flow of processing when the photographing mode is changed from the normal photographing mode to the high luminance priority mode as an example.

When the image processing unit 24 receives the change request from the system control unit 50 and starts the processing in the flowchart in FIG. 6, first, the image processing unit 24 determines whether the photographing mode of the video camera 100 is changed to the high luminance priority mode as processing in S601. More specifically, in S601, the image processing unit 24 determines that the photographing mode of the video camera 100 is changed to the high luminance priority mode when the change request is the one for requesting a change to the gamma characteristic for the high luminance priority mode. In S601, when it is determined that the photographing mode of the video camera 100 is changed to the high luminance priority mode (YES in S601), the image processing unit 24 advances the processing to S602 performed by the contour detection unit 241. On the other hand, in S601, when it is determined that the photographing mode of the video camera 100 is not changed to the high luminance priority mode (NO in S601), the image processing unit 24 terminates the processing in the flowchart in FIG. 6.

In S602, the contour detection unit 241 of the image processing unit 24 detects a contour portion of a video from a video signal input from the A/D converter 23 or the memory control unit 15 in FIG. 2. Further, the contour detection unit 241 transmits contour information indicating the contour portion detected from the video to the contour correction units 2431 and 2432. After S602, the image processing unit 24 advances the processing to S603 performed by the gamma characteristic change unit 245 and the gamma characteristic slope ratio calculation unit 248 (hereinbelow, abbreviated as “the slope ratio calculation unit 248”).

When the processing is advanced to S603, the gamma characteristic change unit 245 of the image processing unit 24 transmits to the gamma correction unit 244 information of the gamma curve of the gamma characteristic in response to the change request from the system control unit 50. In this example, the gamma characteristic in response to the change request is the gamma characteristic for the high luminance priority mode, so that the gamma characteristic change unit 245 transmits the information of the gamma curve of the second gamma characteristic 247 to the gamma correction unit 244. In S603, the slope ratio calculation unit 248 of the image processing unit 24 obtains information pieces of two gamma curves of the first gamma characteristic 246 before the image processing unit 24 receives the change request and of the second gamma characteristic 247 after receiving the change request. Further, in S603, the slope ratio calculation unit 248 calculates a ratio between a slope of the gamma curve of the first gamma characteristic 246 and a slope of the gamma curve of the second gamma characteristic 247 for each luminance.

Figure 7:
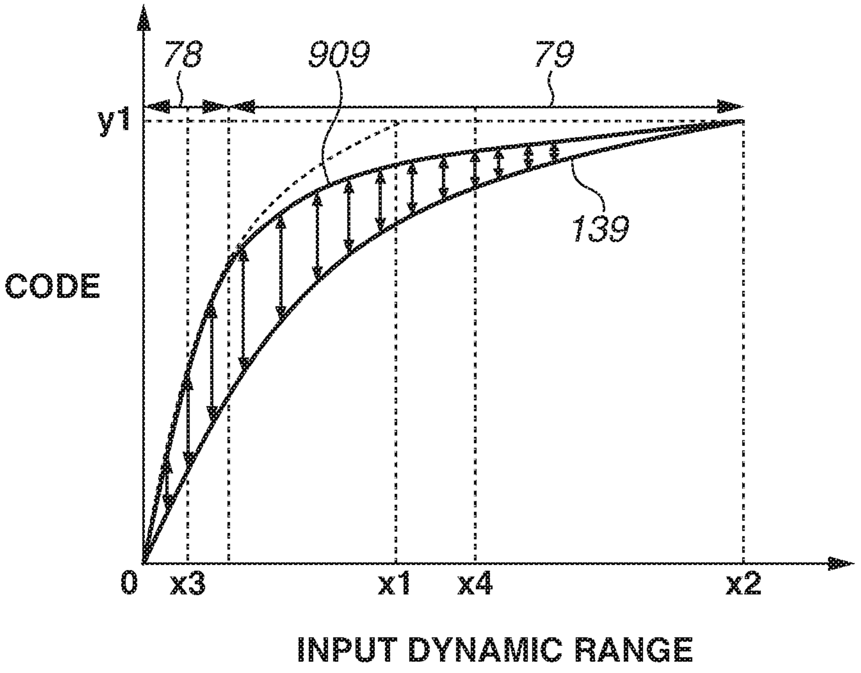
FIG. 7 illustrates an outline of slope ratio calculation of gamma characteristics.

FIG. 7 is a schematic diagram of ratio calculation of slope of each luminance. As illustrated in FIG. 7, in a range 78 in the input dynamic range, the slope of the gamma curve of the first gamma characteristic 246 is larger than the slope of the gamma curve of the second gamma characteristic 247. On the other hand, in a range 79 in FIG. 7, the slope of the gamma curve of the second gamma characteristic 247 is larger than the slope of the gamma curve of the first gamma characteristic 246. The slope ratio calculation unit 248 compares the slope of the gamma curve of the first gamma characteristic 246 to the slope of the gamma curve of the second gamma characteristic 247 for each luminance in the input dynamic range from 0 to *2 illustrated in FIG. 7 and calculates a ratio between these two slopes. For example, it is assumed that the slope of the gamma curve of the first gamma characteristic 246 is indicated by a value “3”, and the slope of the gamma curve of the second gamma characteristic 247 is indicated by a value “2” at the luminance corresponding to the input dynamic range of *3 in FIG. 7. In the case of this example, a ratio between the two gamma curves of the first and the second gamma characteristics 246 and 247 is indicated by a value “1.5” at the luminance corresponding to the input dynamic range of *3. Further, for example, it is assumed that the slope of the gamma curve of the first gamma characteristic 246 is indicated by a value “0.05”, and the slope of the gamma curve of the second gamma characteristic 247 is indicated by a value “0.15” at the luminance corresponding to the input dynamic range of *4 in FIG. 7. In the case of this example, a ratio between the two gamma curves of the first and the second gamma characteristics 246 and 247 is indicated by a value “0.3” at the luminance corresponding to the input dynamic range of *4. The slope ratio is calculated for each luminance in the above description, however, the slope ratio may be calculated for each predetermined range of the input dynamic range. Further, the slope ratio may be calculated according to resolution of contour correction intensity that the contour correction units 2431 and 2432 can specify for each luminance area. The slope ratio calculated by the slope ratio calculation unit 248 is transmitted to the contour correction characteristic calculation unit 242 (hereinbelow, abbreviated as “the correction characteristic calculation unit 242”). After S603, the image processing unit 24 advances the processing to S604 performed by the correction characteristic calculation unit 242.

In S604, the correction characteristic calculation unit 242 calculates a contour correction characteristic by multiplying the contour correction characteristic used by the contour correction units 2431 and 2432 before the image processing unit 24 receives the change request by the value of the slope ratio calculated by the slope ratio calculation unit 248. In this regard, the contour correction characteristic used by the contour correction units 2431 and 2432 before the image processing unit 24 receives the change request is the contour correction characteristic suitable for the first gamma characteristic 246. Thus, in S604, the correction characteristic calculation unit 242 performs calculation for multiplying the contour correction characteristic suitable for the first gamma characteristic 246 by the value of the slope ratio calculated by the slope ratio calculation unit 248. Further, according to the present exemplary embodiment, the contour correction characteristic obtained by multiplying the contour correction characteristic suitable for the first gamma characteristic 246 by the slope ratio is regarded as the contour correction characteristic suitable for the second gamma characteristic 247. As described above, according to the present exemplary embodiment, after the image processing unit 24 receives the change request, the contour correction characteristic used by the contour correction units 2431 and 2432 will be the contour correction characteristic obtained by multiplying the contour correction characteristic suitable for the first gamma characteristic 246 by the value of the slope ratio. Information of the calculated contour correction characteristic in S604 is transmitted to the contour correction units 2431 and 2432. After S604, the image processing unit 24 advances the processing to S605 performed by the contour correction units 2431 and 2432.

In S605, the contour correction unit 2431 performs the contour correction on the video signal based on the contour information transmitted from the contour detection unit 241 and the information of the contour correction characteristic transmitted from the correction characteristic calculation unit 242. The gamma correction unit 244 performs the gamma correction on the video signal after subjected to the contour correction by the contour correction unit 2431 using the second gamma characteristic 247 changed by the gamma characteristic change unit 245. The video signal after subjected to the gamma correction by the gamma correction unit 244 is transmitted to the contour correction unit 2432. As with the contour correction unit 2431, the contour correction unit 2432 performs the contour correction on the video signal based on the contour information transmitted from the contour detection unit 241 and the information of the contour correction characteristic transmitted from the correction characteristic calculation unit 242. Subsequently, the image processing unit 24 performs image processing such as noise reduction processing and geometrical deformation processing, which are not illustrated, on the video signal after subjected to the contour correction by the contour correction unit 2432 and outputs the video signal after subjected to the image processing. According to the present exemplary embodiment, the configuration is described in which the contour correction is performed by the contour correction units 2431 and 2432 before and after the gamma correction processing by the gamma correction unit 244, however, a configuration may be adopted in which the contour correction is performed on only one of before and after the gamma correction processing. Further, a configuration may be adopted in which the contour correction is performed on only one of the contour correction units 2431 and 2432. When the contour correction is performed before and after the gamma correction processing by the gamma correction unit 244, only one of the contour correction units 2431 and 2432 may correct intensity based on the information of the contour correction characteristic.

When the first gamma characteristic 246 is compared to the second gamma characteristic 247 at the input dynamic range of *3 in the above described FIG. 7, the slope of the gamma curve is smaller in the second gamma characteristic 247 than the first gamma characteristic 246 in the low to middle luminance areas. Thus, for example, when the gamma correction is performed by the second gamma characteristic 247, the output code value with respect to the input code value is decreased, and the gradation is lowered than that of when the gamma correction is performed by the first gamma characteristic 246. On the other hand, it is assumed that the contour correction is performed using the contour correction characteristic obtained by multiplying the contour correction characteristic suitable for the first gamma characteristic 246 by the slope ratio of “1.5” described above with reference to the example of the input dynamic range of *3 in FIG. 7 when the gamma correction is performed by the second gamma characteristic 247. In this case, in the contour correction by the contour correction characteristic multiplied by the slope ratio, the contour correction intensity is enhanced than the case when the contour correction is performed by the contour correction characteristic suitable for the first gamma characteristic 246. Thus, in this case, the deterioration of the sense of apparent resolution and the visibility due to the above described lowering in the gradation is corrected at the luminance corresponding to the input dynamic range of *3.

Further, when the gradation characteristics are compared between the first gamma characteristic 246 and the second gamma characteristic 247 at the input dynamic range of *4 in FIG. 7, the slope of the gamma curve is larger in the second gamma characteristic 247 than the first gamma characteristic 246 in the high luminance area. Thus, for example, when the gamma correction is performed by the second gamma characteristic 247, the output code value with respect to the input code value is increased, and the gradation is improved than when the gamma correction is performed by the first gamma characteristic 246. Thus, in this case, the sense of apparent resolution and the sense of sharpness are increased by the improvement in the gradation at the luminance corresponding to the input dynamic range of *4, however, the excessive correction is easily caused in the contour correction. On the other hand, it is assumed that the contour correction is performed using the contour correction characteristic obtained by multiplying the contour correction characteristic suitable for the first gamma characteristic 246 by the slope ratio of “0.3” described above with reference to the example of the input dynamic range of *4 in FIG. 7 when the gamma correction is performed by the second gamma characteristic 247. In this case, in the contour correction by the contour correction characteristic multiplied by the slope ratio, the contour correction intensity is weakened than the case when the contour correction is performed by the contour correction characteristic suitable for the first gamma characteristic 246. Thus, in this case, the contour correction intensity is weakened, and the excessive correction of the contour correction can be avoided while enabling increase of the sense of apparent natural resolution and the sense of sharpness by the improvement in the gradation in the high luminance area.

As described above, according to the present exemplary embodiment, when the first gamma characteristic 246 for the normal photographing mode is changed to the second gamma characteristic 247 for the high luminance priority mode, the contour correction characteristic is changed according to the change in the gradation in the luminance area due to the change in the gamma characteristic. In other words, according to the present exemplary embodiment, when the gradation is lowered, the contour correction is enhanced to reduce the deterioration of the sense of apparent resolution and the visibility, and when the gradation is improved, the contour correction is weakened to avoid the excessive correction of the contour correction. As described above, according to the present exemplary embodiment, when the normal photographing mode is changed to the high luminance priority mode, an impression of the contour correction in the normal photographing mode can be maintained. Therefore, according to the present exemplary embodiment, when the gamma characteristic is changed in accordance with the change of the photographing mode, the lowering of the image quality by the contour correction can be prevented, and the contour correction suitable for the gamma characteristic can be performed.

<Configuration of Second Exemplary Embodiment>

According to the first exemplary embodiment, the example is described in which the contour correction characteristic is changed to correspond to the change of the gradation due to the change in the gamma characteristic. The gamma characteristic 139 in the above-described high luminance priority mode is a characteristic which makes an apparent displayed video dark in the low to middle luminance areas as compared to the gamma characteristic 909 in the normal photographing mode when a peak luminance is the same in an output apparatus such as the display unit 28. Thus, when the photographing mode is the high luminance priority mode, it is desirable to increase a peak luminance of a video signal output to the display unit 28 and the like. Thus, according to a second exemplary embodiment, an example is described in which, when the photographing mode is the high luminance priority mode, the contour correction characteristic is changed on the premise that the peak luminance of the video signal output to the display unit 28 and the like is increased. The external appearance configuration and the internal configuration of the video camera 100 according to the second exemplary embodiment are similar to those described above in FIGS. 1 and 2, and thus illustration and description thereof are omitted.

Figure 8:
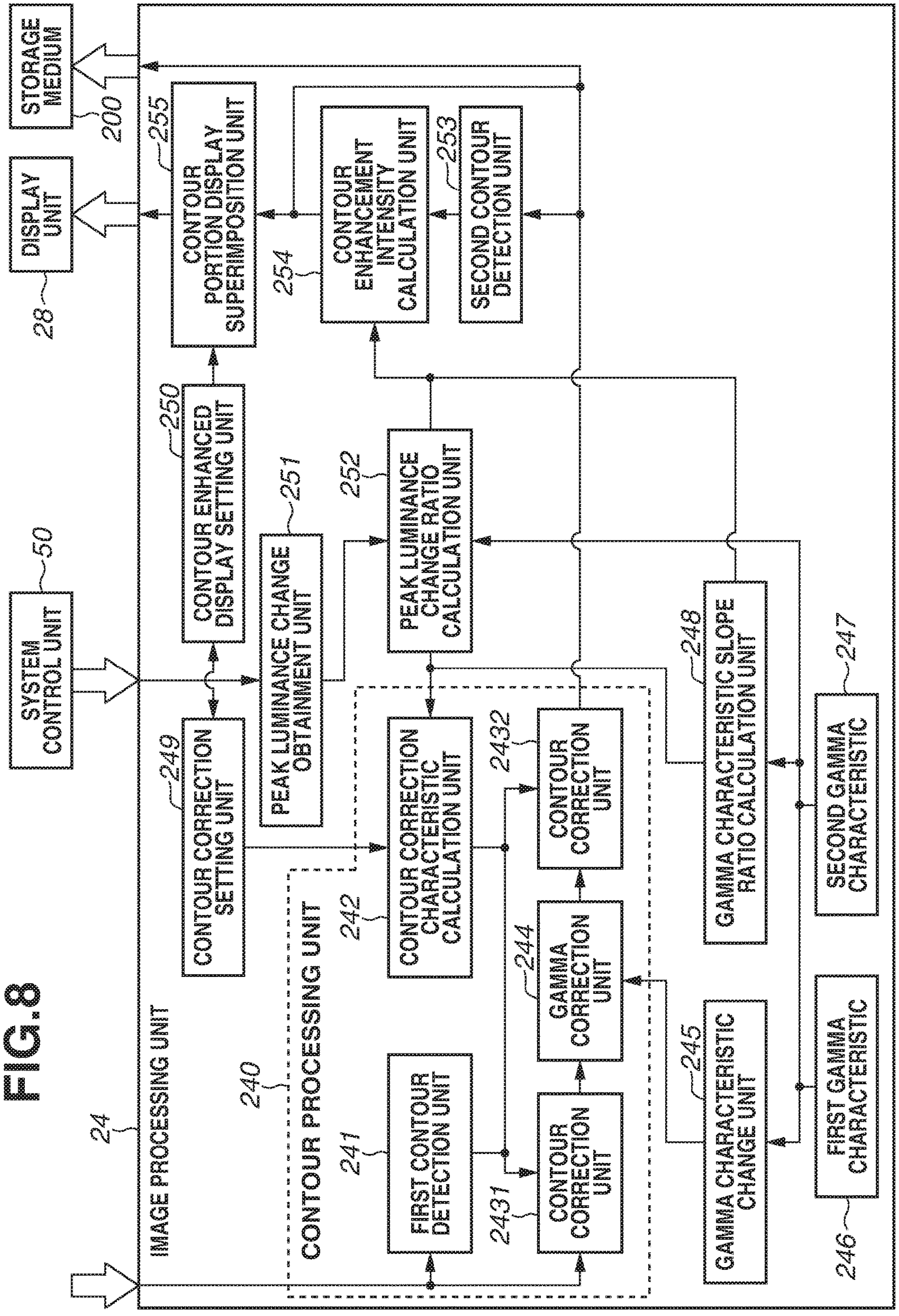
FIG. 8 is a functional block diagram illustrating a main part of an image processing unit according to a second exemplary embodiment.

FIG. 8 illustrates each main processing performed by the image processing unit 24 of the video camera 100 according to the second exemplary embodiment as a functional block. FIG. 8 illustrates an example which corresponds to two modes, i.e., the normal photographing mode and the high luminance priority mode as the photographing modes as with the example in FIG. 5. In FIG. 8, the functional blocks same as those described above in FIG. 5 are denoted by the same reference numerals used in FIG. 5, and description thereof is omitted. In this regard, a first contour detection unit 241 in FIG. 8 is the same as the contour detection unit 241 in FIG. 5. Further, in the example in FIG. 8, two modes, i.e., the normal photographing mode and the high luminance priority mode are described as the photographing modes, and the first gamma characteristic 246 for the normal photographing mode and the second gamma characteristic 247 for the high luminance priority mode are provided as with the example described above in FIG. 5. According to the second exemplary embodiment, there is a plurality of photographing modes other than the normal photographing mode and the high luminance priority mode, and information of the gamma curve of a plurality of the gamma characteristics is also provided or generated corresponding to each of the plurality of photographing modes as with the first exemplary embodiment. Further, when any one of the gamma characteristics is used by the change of the photographing mode, the contour correction characteristic suitable for the gamma characteristic to be used is generated.

In the image processing unit 24 in FIG. 8, a gamma correction unit according to the present exemplary embodiment includes the first gamma characteristic 246, the second gamma characteristic 247, the gamma characteristic change unit 245, and the gamma correction unit 244, and each configuration other than those are included in a contour processing unit according to the present exemplary embodiment.

In the image processing unit 24 according to the second exemplary embodiment illustrated in FIG. 8, when the gamma characteristic is changed due to the change of the photographing mode, the contour correction characteristic is changed in the similar manner as described above according to the first exemplary embodiment. According to the second exemplary embodiment, when the peak luminance of the display unit 28 is changed, the system control unit 50 transmits peak luminance change information to a peak luminance change obtainment unit 251 (hereinbelow, abbreviated as "the change obtainment unit 251"). The change obtainment unit 251 transmits the peak luminance change information obtained from the system control unit 50 to a peak luminance change ratio calculation unit 252 (hereinbelow, abbreviated as "the change ratio calculation unit 252"). When an output apparatus for displaying a video is an external display apparatus and the like connected to the video camera 100, and the peak luminance of the display apparatus and the like is changed, a change of the peak luminance in the display apparatus and the like may be detected. In this case, a configuration may be adopted as an example in which the system control unit 50 detects the change of the peak luminance in the external display apparatus connected thereto via the connector 112 and the like, generates peak luminance change information, and transmits the peak luminance change information to the change obtainment unit 251.

The change ratio calculation unit 252 obtains information pieces of the gamma curves from the first gamma characteristic 246 and the second gamma characteristic 247. The change ratio calculation unit 252 calculates values of the both gamma curves of the first and the second gamma characteristics 246 and 247 for each luminance in the above-described input dynamic range in the middle to low luminance areas which are less than an area in which the knee processing is performed in the first gamma characteristic 246. The ratio calculated here corresponds to a ratio of the peak luminance change (hereinbelow, referred to as "the peak luminance change ratio") at which apparent brightness becomes the same in the middle to low luminance areas when the peak luminance of the display unit is changed. It is assumed that the peak luminance change ratio is "2". The peak luminance change ratio of "2" represents that the peak luminance of the display unit 28 needs to be set to two times when output luminance in the middle to low luminance areas using the second gamma characteristic 247 is adjusted to output luminance in the middle to low luminance areas using the first gamma characteristic 246. The change ratio calculation unit 252 transmits information of the peak luminance change ratio to the correction characteristic calculation unit 242. When an output apparatus for displaying a video is an external display apparatus and the like connected to the video camera 100, and the peak luminance of the display apparatus and the like is changed, a configuration may be adopted which obtains information of the peak luminance change ratio from the display apparatus and the like. In this case, a configuration may be adopted as an example in which the system control unit 50 obtains the peak luminance change ratio information from the external display apparatus connected thereto via the connector 112 and the like and transmits the peak luminance change ratio information to the change ratio calculation unit 252 via the change obtainment unit 251.

The correction characteristic calculation unit 242 generates the contour correction characteristic by multiplying the contour correction characteristic suitable for the first gamma characteristic 246 by the slope ratio as with the above-described first exemplary embodiment. According to the second exemplary embodiment, the contour correction characteristic corresponding to the second gamma characteristic 247 is generated by further multiplying the contour correction characteristic multiplied by the slope ratio by an inverse number of the peak luminance change ratio. In other words, the contour correction characteristic generated by the correction characteristic calculation unit 242 according to the second exemplary embodiment is the contour correction characteristic suitable for the second gamma characteristic 247 on the premise that the peak luminance is increased in the display unit 28. For example, when the peak luminance is changed to increase the peak luminance of the display unit 28 by two times, the contrast of the entire screen of the display unit 28 is increased, and the sense of apparent resolution and the visibility are improved. However, if the contour correction characteristic generated as in the case of the first exemplary embodiment is used in a state in which the peak luminance of the display unit 28 is increased by two times, jaggies and noise notably appear. Thus, according to the second exemplary embodiment, the contour correction processing is performed by the contour correction characteristic obtained by further multiplying the contour correction characteristic multiplied by the slope ratio as described above by the inverse number of the peak luminance change ratio (1/2 in the example). Thus, according to the second exemplary embodiment, the deterioration of the image quality due to jaggies, noise, and the like can be prevented.

<Function of Displaying In-Focus State>

The video camera 100 according to the present exemplary embodiment also has a function of enhancing a contour of a focused object image in a video signal being captured and displaying the contour on the display unit 28 and the like by superimposing on the video signal for a live view video (through video) being captured. As described above, the contour of the focused object image is enhanced and displayed by superimposing on the live view video (through video), and thus a user can easily confirm an in-focus state of the object. In the case that the contour of the focused object image is enhanced and superimposed on the video signal, a case is considered, for example, when the gamma characteristic is changed in response to the change of the photographing mode as described above, and the peak luminance is also changed. In this case, when the in-focus state of the video being captured is displayed, appearance of the contour enhanced display is changed by the change of the gradation due to the change of the gamma characteristic and the change of the peak luminance of the display unit 28, and there is a possibility that usability is lowered. Thus, the video camera 100 according to the second exemplary embodiment includes a configuration described below so as to prevent a change in the appearance of the contour enhanced display by a function for displaying the in-focus state.

The image processing unit 24 according to the second exemplary embodiment includes a second contour detection unit 253 in addition to the first contour detection unit 241 which is the contour detection unit 241 described above according to the first exemplary embodiment. To the second contour detection unit 253, the video signal is input which is subjected to the contour correction by the contour correction unit 2432 and output to the outside or stored in the storage medium 200. The second contour detection unit 253 is an example of a focused contour detection unit which detects contour information indicating a focused object image from the input video signal. The second contour detection unit 253 transmits the contour information of the focused object image to a contour enhancement intensity calculation unit 254 (hereinbelow, abbreviated as "the enhancement intensity calculation unit 254").

The enhancement intensity calculation unit 254 receives information of the above-described slope ratio from the slope ratio calculation unit 248 and information of the above-described peak luminance change ratio from the change ratio calculation unit 252 in addition to the contour information of the focused object image. The enhancement intensity calculation unit 254 calculates information of contour enhancement intensity for indicating the in-focus state by enhancing the contour of the focused object image based on the contour information of the focused object image, the information of the slope ratio, and the information of the peak luminance change ratio. The information of the contour enhancement intensity indicates the enhanced contour of the focused object image. In other words, the enhancement intensity calculation unit 254 according to the present exemplary embodiment calculates the contour enhancement intensity by considering the change of the gradation in the gamma characteristic and the change of the peak luminance of the display unit 28 when calculating the contour enhancement intensity for enhancing the contour of the focused object image. More specifically, when the appearance of the contour of the focused object image is changed due to the change of the gamma characteristic and the change of the peak luminance, the enhancement intensity calculation unit 254 calculates the contour enhancement intensity for suppressing the change in the appearance of the contour of the focused object image. For example, the contour enhancement intensity is calculated which makes the contour bright when the contour of the focused object image becomes dark and suppresses the brightness of the contour when the contour of the focused object image becomes too bright by the change of the gamma characteristic. Further, for example, when jaggies, noise, and the like are increased in the contour of the focused object image by the change of the peak luminance, the contour enhancement intensity is calculated which suppresses the increase in jaggies, noise, and the like while enhancing the contour of the focused object image. Furthermore, the enhancement intensity calculation unit 254 transmits the information of the contour enhancement intensity to a contour portion display superimposition unit 255 (hereinbelow, referred to as "the display superimposition unit 255").

To the display superimposition unit 255, the video signal is input which is subjected to the contour correction by the contour correction unit 2432. The display superimposition unit 255 performs the contour enhancement processing for enhancing the contour of the focused object image based on the contour enhancement intensity from the enhancement intensity calculation unit 254. Further, the display superimposition unit 255 superimposes the contour of the focused object image which is subjected to the contour enhancement processing by the contour enhancement intensity on the video signal subjected to the contour correction by the contour correction unit 2432. Accordingly, the display superimposition unit 255 outputs the video signal in which the contour of the focused object image is enhanced among the video signals which are subjected to the contour correction by the contour correction unit 2432. The video signal in which the contour of the focused object image is enhanced is transmitted to the display unit 28.

As described above, when the contour of the focused object image is enhanced and displayed by superimposing on a live view video, the video camera 100 according to the second exemplary embodiment generates the contour enhancement intensity by considering the change of the gamma characteristic and the change of the peak luminance. Further, the video camera 100 according to the second exemplary embodiment superimposes the contour enhancement intensity which considers the change of the gamma characteristic and the change the peak luminance on the video signal subjected to the contour correction by the contour correction unit 2432. Therefore, according to the present exemplary embodiment, the appearance in the contour enhanced display indicating the in-focus state is maintained approximately constant, and lowering of the usability can be prevented.

<Setting of Contour Correction and Setting of In-Focus State Display>

To the video camera 100 according to the present exemplary embodiment, a user can arbitrarily set whether to perform the contour correction processing on the video signal output to the outside or stored as described above and whether to perform the contour enhanced display for displaying the in-focus state of the video being captured. Thus, the image processing unit 24 according to the second exemplary embodiment includes a contour correction setting unit 249 and a contour enhanced display setting unit 250. A configuration for setting the contour correction and setting the contour enhanced display of the in-focus state is described below.

The video camera 100 according to the second exemplary embodiment can perform the setting of whether to perform the above-described contour correction on the video signal output to the outside or stored by, for example, a user operation via the operation unit 70. A setting of whether to perform the contour correction is performed by a user selecting any of "enabled" or "disabled" of the contour correction via the operation unit 70. The system control unit 50 transmits to the contour correction setting unit 249 contour correction setting information indicating which of "enabled" or "disabled" that the contour correction is set to. When the contour correction setting information is received, the contour correction setting unit 249 transmits the information to the correction characteristic calculation unit 242.

The correction characteristic calculation unit 242 determines which of "enabled" or "disabled" that the contour correction is set to from the contour correction setting information and calculates the above-described contour correction characteristic when the contour correction is set to "enabled". On the other hand, the correction characteristic calculation unit 242 does not calculate the above-described contour correction characteristic when the contour correction is set to "disabled".

The video camera 100 according to the second exemplary embodiment can set, for example, whether to perform the contour enhanced display for displaying the in-focus state of the video being captured by a user operation via the operation unit 70. A setting of whether to display the in-focus state is performed by a user selecting any of "enabled" or "disabled" of the display of the in-focus state via the operation unit 70. The system control unit 50 transmits contour enhanced display setting information indicating that the display of the in-focus state is set to "enabled" or "disabled" to the contour enhanced display setting unit 250 (hereinbelow, abbreviated as "the display setting unit 250"). When the contour enhanced display setting information is obtained, the display setting unit 250 transmits the information to the display superimposition unit 255.

The display superimposition unit 255 determines which of "enabled" or "disabled" that the contour enhanced display is set to from the contour enhanced display setting information. When the contour enhanced display is set to "enabled", the display superimposition unit 255 superimposes the contour of the focused object image subjected to the contour enhancement by the contour enhancement intensity calculated as described above by considering the contour correction characteristic on the video signal. On the other hand, when the contour enhanced display is set to "disabled", the display superimposition unit 255 does not perform the contour enhancement of the focused object image by the contour enhancement intensity considering the contour correction characteristic.

According to the second exemplary embodiment, whether to perform each of the contour correction processing and the contour enhanced display processing is determined in response to the setting of "enabled" or "disabled" in the setting information of the each processing, however, exclusive control may be performed in which these two processes are both performed and either of these two processes is not performed. For example, when any one of the contour correction processing and the contour enhanced display processing is performed, the other processing is also performed. Further, for example, in the case that the contour correction processing is not performed in the contour correction processing and the contour enhanced display processing, the contour enhanced display may be performed by the contour enhancement intensity which does not consider the contour correction characteristic of the contour correction processing when the contour enhanced display processing is performed. Accordingly, when the both of the contour correction processing and the contour enhanced display processing are performed, correction is performed on the both processes, and excessive or deficient correction can be prevented in the contour enhanced display processing.

<Processing Flow in Second Exemplary Embodiment>

Figure 9:
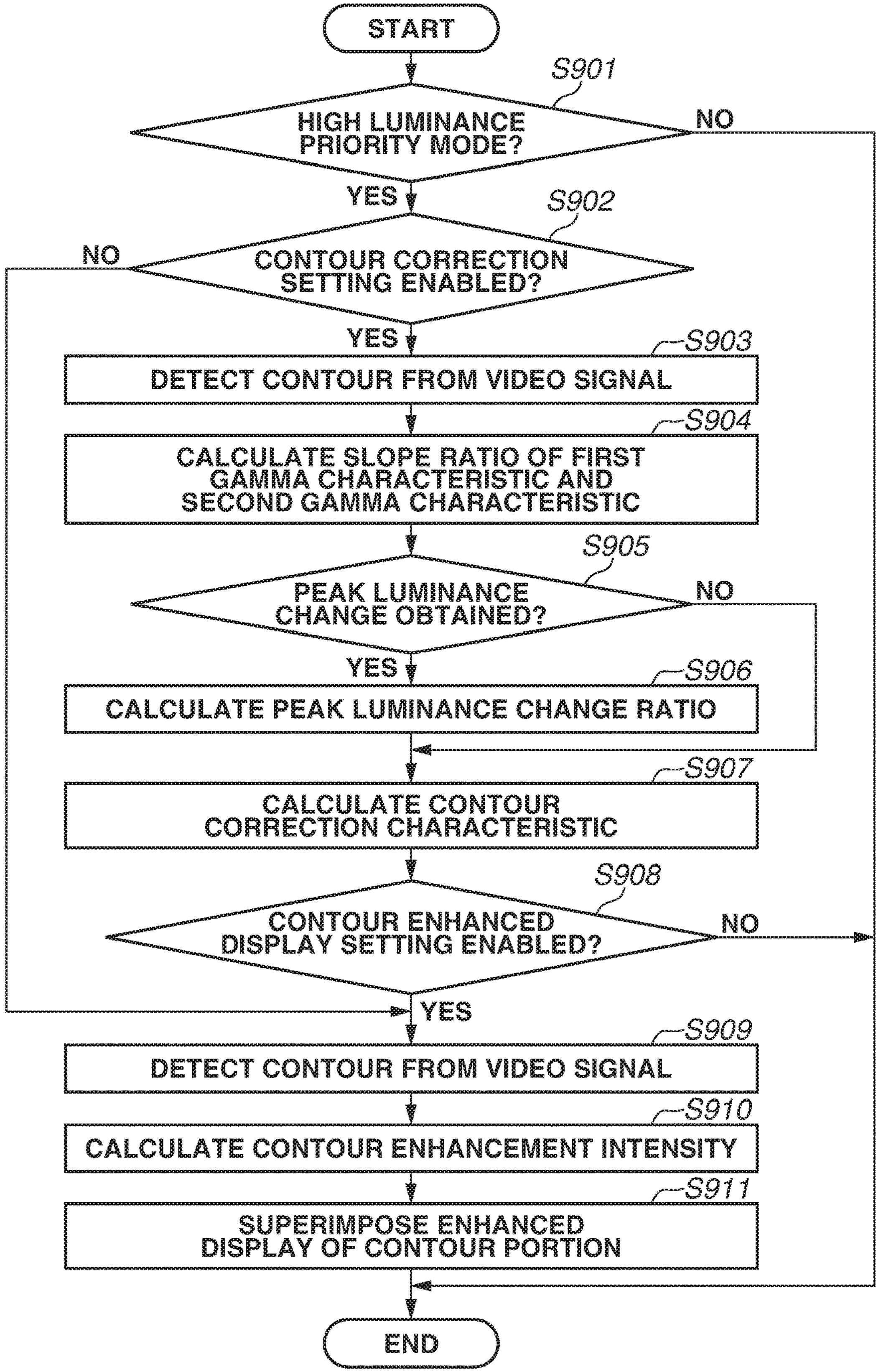
FIG. 9 is a flowchart illustrating processing according to the second exemplary embodiment.

FIG. 9 is a flowchart illustrating a flow from the change setting processing of the gamma characteristic in response to the change of the photographing mode to the generation of the contour correction characteristic, the contour correction processing, and further the contour enhanced display processing of the focused object image performed by the image processing unit 24 according to the second exemplary embodiment. In the following description, steps S901 to S911 of each processing in FIG. 9 is abbreviated as S901 to S911. The image processing unit 24 executes a video signal processing program according to the second exemplary embodiment and realizes the processing in the flowchart illustrated in FIG. 9. Although it is not illustrated, the image processing unit 24 may perform the processing in the flowchart in FIG. 9 using the gamma correction unit, the contour correction unit, and the like provided as the hardware configuration. In the case of the example in which the image processing unit 24 includes the gamma correction unit, the contour correction unit, and the like as the hardware configuration, the system control unit 50 executes the control program and controls the hardware configuration of the image processing unit 24 to realize the processing in the flowchart in FIG. 9.

When the photographing mode is changed, the system control unit 50 of the video camera 100 according to the second exemplary embodiment transmits a change request similar to that in the above-described first exemplary embodiment to the image processing unit 24. The image processing unit 24 starts the processing in the flowchart in FIG. 9 when receiving the change request from the system control unit 50. As with the example described above in FIG. 5, the photographing mode is set to the normal photographing mode before the image processing unit 24 receives the change request, and the flow of processing when the photographing mode is changed from the normal photographing mode to the high luminance priority mode is illustrated in the flowchart in FIG. 9.

When the image processing unit 24 receives the change request from the system control unit 50 and starts the processing in the flowchart in FIG. 9, first, the image processing unit 24 determines whether the photographing mode of the video camera 100 is changed to the high luminance priority mode as processing in S901. The determination processing in S901 is similar to the determination processing in S601 in FIG. 5. In S901, when it is determined that the photographing mode of the video camera 100 is changed to the high luminance priority mode (YES in S901), the image processing unit 24 advances the processing to S902 performed by the contour correction setting unit 249.

In S902, the contour correction setting unit 249 obtains the above-described contour correction setting information from the system control unit 50 and determines whether the setting of the contour correction is "enabled". When the setting of the contour correction is set to not "enabled" but "disabled" by the contour correction setting unit 249 (NO in S902), the image processing unit 24 advances the processing to S909 described below. On the other hand, in S902, when it is determined that the setting of the contour correction is set to "enabled" by the contour correction setting unit 249

(YES in S902), the image processing unit 24 advances the processing to S903 performed by the first contour detection unit 241.

When the processing is advanced to S903, the first contour detection unit 241 detects the contour portion of the video from the input video signal to calculate the contour correction characteristic as with the above-described first exemplary embodiment. Further, the first contour detection unit 241 transmits the contour information indicating the contour portion detected from the video to the contour correction units 2431 and 2432. After S903, the image processing unit 24 advances the processing to S904 performed by the gamma characteristic change unit 245 and the slope ratio calculation unit 248. The processing in S904 is similar to the processing described above in S603 in FIG. 6. Thus, in S904, the gamma characteristic change unit 245 transmits to the gamma correction unit 244 the information of the gamma curve of the gamma characteristic in response to the change request from the system control unit 50 as with the above-described first exemplary embodiment. Further, in S904, the slope ratio calculation unit 248 calculates the slope ratio as with the above-described case from the gamma curve of the first gamma characteristic 246 before reception of the change request and the gamma curve of the second gamma characteristic 247 after reception of the change request. After S904, the image processing unit 24 advances the processing to S905 performed by the change obtainment unit 251.

In S905, the change obtainment unit 251 determines whether the peak luminance change information is obtained from the system control unit 50 as described above. In S905, when it is determined that the peak luminance change information is obtained (YES in S905), the change obtainment unit 251 advances the processing to S906 performed by the change ratio calculation unit 252. In S906, the change ratio calculation unit 252 calculates the peak luminance change ratio as described above. After S906, the image processing unit 24 advances the processing to S907 performed by the correction characteristic calculation unit 242.

In S907, the correction characteristic calculation unit 242 generates the contour correction characteristic suitable for the second gamma characteristic 247 by multiplying the contour correction characteristic suitable for the contour correction characteristic suitable for the first gamma characteristic 246 multiplied by the slope ratio by an inverse number of the peak luminance change ratio as described above. After S907, the image processing unit 24 advances the processing to S908 performed by the display setting unit 250 and the display superimposition unit 255. In S908, when the contour enhanced display setting information for displaying the above described in-focus state of the video being captured is obtained from the system control unit 50, the display setting unit 250 transmits the contour enhanced display setting information to the display superimposition unit 255. The display superimposition unit 255 determines whether the setting of the contour enhanced display is "enabled" from the contour enhanced display setting information. In S908, when the display superimposition unit 255 determines that the setting of the contour enhanced display is "enabled" (YES in S908), the image processing unit 24 advances the processing to S909 performed by the second contour detection unit 253. On the other hand, in S908, when the display superimposition unit 255 determines that the setting of the contour enhanced display is not "enabled" but "disabled" (NO in S908), the image processing unit 24 terminates the processing in the flowchart in FIG. 9.

When the processing is advanced to S909, the second contour detection unit 253 detects the contour portion of the focused object image from the video signal input from the contour correction unit 2432. In this regard, the video signal input from the contour correction unit 2432 to the second contour detection unit 253 in S909 is the video signal subjected to the contour correction processing by the contour correction characteristic calculated in the above-described S907 when the contour correction setting information is "enabled" in S902. On the other hand, when the contour correction setting information is "disabled" in S902, the video signal input to the second contour detection unit 253 is the video signal subjected to the contour correction processing by not the contour correction characteristic calculated in S907 but the contour correction characteristic used before the change of the gamma characteristic. The second contour detection unit 253 transmits to the enhancement intensity calculation unit 254 the contour information of the focused object image detected from the video signal input from the contour correction unit 2432. After S909, the image processing unit 24 advances the processing to S910 performed by the enhancement intensity calculation unit 254.

In S910, the enhancement intensity calculation unit 254 calculates the contour enhancement intensity with respect to the contour of the focused object image detected from the video signal input from the contour correction unit 2432. As described above, the video signal when the contour correction setting information is "enabled" in S902 is the video signal subjected to the contour correction processing by the contour correction characteristic calculated in S907. On the other hand, as described above, the video signal when the contour correction setting information is "disabled" in S902 is the video signal subjected to the contour correction processing by the contour correction characteristic used before the change of the gamma characteristic. Thus, when the contour correction setting information is "enabled" in S902, the enhancement intensity calculation unit 254 calculates the contour enhancement intensity with respect to the contour of the focused object image from the video signal subjected to the contour correction processing by the contour correction characteristic calculated in S907. On the other hand, when the contour correction setting information is "disabled" in S902, the enhancement intensity calculation unit 254 calculates the contour enhancement intensity with respect to the contour of the focused object image from the video signal subjected to the contour correction processing by the contour correction characteristic used before the change of the gamma characteristic. After S910, the image processing unit 24 advances the processing to S911 performed by the display superimposition unit 255.

In S911, the display superimposition unit 255 performs contour intensity enhancement processing for superimposing the contour of the focused object image on the video signal subjected to the contour correction by the contour correction unit 2432 and outputs the video signal to the display unit 28 as described above. In other words, when the contour correction setting information is "enabled" in S902, the display superimposition unit 255 superimposes the contour of the focused object image subjected to the enhancement processing by the contour enhancement intensity calculated in S910 on the video signal after subjected to the contour correction processing by the contour correction characteristic calculated in S907. On the other hand, when the contour correction setting information is "disabled" in S902, the display superimposition unit 255 superimposes the contour of the focused object image on the video signal subjected to the contour correction processing by the contour correction characteristic used before the change of the gamma characteristic. After S911, the image processing unit 24 terminates the processing in the flowchart in FIG. 9.

Other Embodiments

According to the above described first and second exemplary embodiments, the contour correction characteristic is calculated based on the slope ratio of the gamma curve of the gamma characteristic, however, the contour correction characteristic corresponding to the gamma characteristic may be calculated in advance and provided as a table. In this case, when the gamma characteristic is changed, information of the contour correction characteristic corresponding to the changed gamma characteristic is obtained from the table, and the contour correction is performed based on the contour correction characteristic.

The embodiments can also be realized by executing processing in which a program for realizing one or more functions of the above exemplary embodiments is supplied to a system or an apparatus via a network or a storage medium, and one or more processors in a computer of the system or the apparatus reads and executes the program. In addition, the embodiments can also be realized by a circuit (for example, an application specific integrated circuit (ASIC)) for realizing one or more functions.

The exemplary embodiments described above are merely examples for implementing the disclosure, so that the examples should not be construed restrictively limiting the technical scope of the disclosure. In other words, the disclosure can be implemented in the various forms without departing from the technical idea and/or the main features thereof.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-217741, filed Nov. 5, 2015, which is hereby incorporated by reference herein in its entirety.

What is claimed is:

1. A video signal processing apparatus comprising:
- a processor; and
- a memory containing instructions that, when executed by the processor, cause the processor to perform operations comprising:
  - performing gamma correction on a video signal using a gamma characteristic selected from among a plurality of gamma characteristics; and
  - processing contour comprising calculating, in a case where a first gamma characteristic used in the gamma correction is changed to a second gamma characteristic by selection of the gamma characteristic, and based on a ratio of a slope between a gamma curve of the first gamma characteristic and a gamma curve of the second gamma characteristic, a contour correction characteristic corresponding to the second gamma characteristic and performing contour correction using the contour correction characteristic on the video signal.

2. The video signal processing apparatus according to claim 1, wherein processing contour further comprises:
- calculating, in a case where the gamma characteristic used in the gamma correction is changed from the first gamma characteristic to the second gamma characteristic, the ratio of the slope for each luminance in an input dynamic range for the gamma correction with respect to an luminance of a video signal; and
- calculating the contour correction characteristic by multiplying the contour correction characteristic used in the contour correction in a case where gamma correction is performed by the first gamma characteristic by the ratio of the slope.

3. The video signal processing apparatus according to claim 1, wherein processing contour further comprises:
- detecting a contour of a focused object image from a video signal after subjected to the contour correction;
- calculating a contour enhancement intensity with respect to the contour of the object image; and
- performing contour enhancement processing on the contour of the object image based on the calculated contour enhancement intensity and superimpose the contour of the object image subjected to the contour enhancement processing on the video signal after subjected to the contour correction.

4. The video signal processing apparatus according to claim 3, wherein calculating a contour enhancement intensity comprises calculating the contour enhancement intensity with respect to the contour of the object image based on the contour correction characteristic corresponding to the gamma characteristic used in the gamma correction.

5. The video signal processing apparatus according to claim 1, wherein performing gamma correction comprises performing gamma correction on the video signal using any of gamma characteristics including:
- the first gamma characteristic having a relationship in which an output value is compressed with respect to an input value in a high luminance area of a video signal with respect to a relationship between an input value and an output value in a gamma characteristic defined by a standard, and
- the second gamma characteristic in which a relationship between an input value and an output value in an entire luminance areas from low to high luminance areas of a video signal matches with the relationship between an input value and an output value in the gamma characteristic defined by the standard regardless of an input dynamic range for gamma correction.

6. A method for processing a video signal, the method comprising:
- performing gamma correction on a video signal using a gamma characteristic selected from among a plurality of gamma characteristics; and
- calculating, in a case where a first gamma characteristic used in the gamma correction is changed to a second gamma characteristic by selection of the gamma characteristic, and based on a ratio of a slope between a gamma curve of the first gamma characteristic and a gamma curve of the second gamma characteristic, a contour correction characteristic corresponding to the second gamma characteristic and performing contour correction using the contour correction characteristic on the video signal.

* * * * *